Dec. 9, 1952 L. F. GUIMBRETIERE ET AL 2,620,566
THREAD GAUGING INSTRUMENT
Filed Nov. 19, 1947 2 SHEETS—SHEET 1

INVENTORS:
Louis Francois Guimbretiere
Eugene Jean Sorez
By Frank H. Wisch
Att'y.

Dec. 9, 1952   L. F. GUIMBRETIERE ET AL   2,620,566
THREAD GAUGING INSTRUMENT

Filed Nov. 19, 1947                                     2 SHEETS—SHEET 2

INVENTORS:
Louis François Guimbretiere
Eugene Jean Sorez
By Frank H. Wisch
Att'y.

Patented Dec. 9, 1952

2,620,566

UNITED STATES PATENT OFFICE 2,620,566

THREAD GAUGING INSTRUMENT

Louis François Guimbretiere, Montfaucon, and Eugène Jean Sorez, Roubaix, France

Application November 19, 1947, Serial No. 786,970
In France November 25, 1946

13 Claims. (Cl. 33—125)

1

The machines and instruments serving for the gauging of the diameter or cross-section of threads of any kind whatever now in use provide: either a number of checkings at different points distributed throughout the thread to be examined; or a mechanical or photographic recording of the variations in the thread; or else a rough recording of the number of defects at least equal to the limit allowance of variations in cross-section.

Our present invention has for its object a means for checking and measuring threads in order to provide automatically a statistical record of all the values of diameters or cross-sections shown in succession by the sample that is being examined and the transformation of this record into statistical and/or graphic tabulae.

The statistical record of the diameters or cross-sections of the thread should be executed without any alteration in the natural state of the thread undergoing examination and the feeler used for this purpose according to our invention is constituted therefore by a suitable amount of a non-wetting liquid such as mercury. Our invention will be better understood through the following disclosure given out with reference to accompanying drawings illustrating the invention by way of mere exemplification. In said drawings:

Figs. 9, 10 and 11 are diagrammatic showings of various embodiments thereof while

Figure 1:
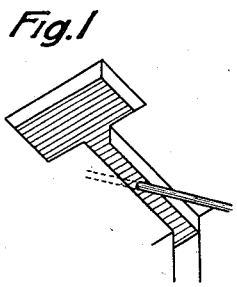
Figs. 1 to 8 are diagrammatic showings illustrating the principle of our invention.
Figure 14:
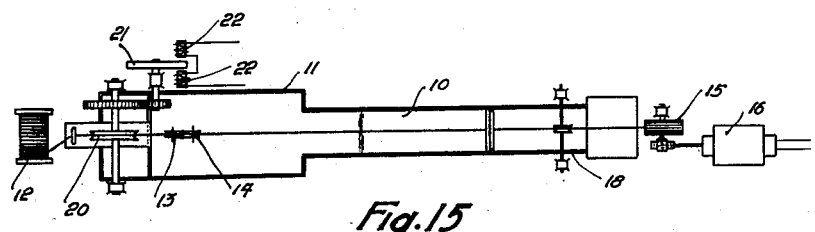
Fig. 14 is a plane view of the wall of a channel giving a decrease of the mercury level in proportion to the diameter of the thread.

The apparatus according to our invention is constituted chiefly as shown in Figs. 1 and 14 by a channel 10 partially filled with mercury that communicates with a container of large size 11 forming a reservoir of mercury. The thread to be studied is unwound from a bobbin 12 and driven by guides 13, 14 within the container 11, so as to enter the channel underneath the mercury level therein and passes obliquely out of the mercury through its free level being drawn through a winch 15 driven by a motor 16. A suitable ar-

2 rangement such as that described thereafter with reference to Fig. 14 provides for the continuous drive of the thread under constant mechanical tensional stress whereby all portions of the thread pass in succession through said free level.

Figure 2:
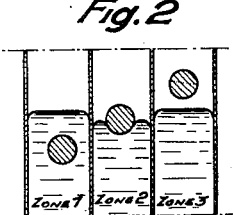

Under such conditions three main zones may be distinguished in the channel (Fig. 2) to wit: a first zone in which the mercury covers the thread entirely, a second zone in which the thread emerges out of the mercury and a third uppermost zone wherein the thread is already out of the mercury bath. In the transitional parts separating these three zones appear capillary phenomena that are in the present case of the highest importance.

Surface pressure phenomena appear as well known for instance when tubes or the like reservoirs of different diameters containing the same liquid are caused to communicate. Experience shows that with water, oil or any liquid that wets the wall, the liquid rises to a higher extent in the narrower tube and all the more so when said tube is more narrow. On the contrary, in the case of mercury that does not wet the walls, the liquid does not rise but on the contrary sinks to an extent that is proportional to the reciprocal of the diameter as disclosed by the so called Jurin laws.

Figure 3:
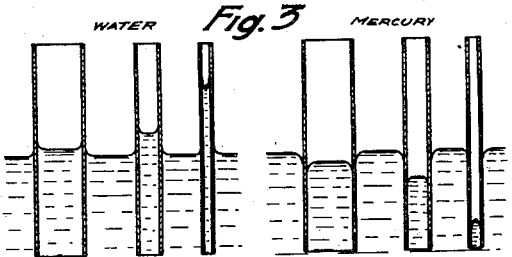

Fig. 3 shows respectively on the left hand side capillary phenomena in the case of water and on the right hand side in the case of mercury.

Considering now the three zones of our liquid channel, it will be noticed that the breadth of the three surfaces of the liquid is the same in the first and third zones. The same mercury level with reference to that in the above-mentioned reservoir of mercury will therefore appear in said latter zones. On the contrary, inside the medial zone of the channel through which the thread emerges from the mercury, the free surface of the mercury is subdivided in two parts of a reduced breadth and consequently the depression of the mercury is more considerable than in the two adjacent outer zones by reason of said Jurin laws.

Now if the thread is caused to move lengthwise through the channel, the thread will show at the point of its emersion a succession of thicker and narrower parts by reason of its natural unevenness. The level of the mercury in the zones 1 and 3 will not be modified but the level of the mercury in the medial zone will show a difference in level that varies at every moment in accordance with the breadth remaining free between the surface of the thread and the walls of the channel. Now these variations in level are made use of as disclosed hereinafter.

Figure 4:
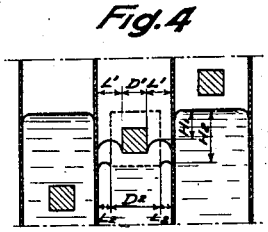

For an easier disclosure, we will first suppose that the thread has a cross-section that is not round but square, as shown in Fig. 4.

Figure 5:
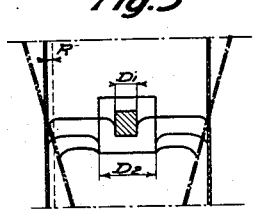

In its initial state, the width D1 of the thread appearing at the point of emersion provides a certain free breadth L1 at the surface of the liquid. This leads to a certain local depression of the mercury that sinks through a height H1 with reference to the adjacent zones of the channel. The thread under examination moves along and if a swelling appears on it the width of the thread at the point of emersion of said swelling increases from D1 to D2 as shown in interrupted lines. The free breadth of the mercury is then reduced from L1 to L2. The depression increases consequently from H1 to H2. The preceding disclosure relating to Jurin laws is sufficient to show that for a suitable breadth of the channel it is possible to obtain a vertical variation in the mercury level that may be sufficient for detecting variations in the diameter of the thread. The sensitivity of the arrangement may be increased in considerable proportions inter alia by a simple contrivance, for instance, that consists in giving the walls of the channel a suitable slope (Fig. 5).

As a matter of fact, if the thread increases in breadth from D1 to D2 inside a channel with vertical walls, this leads to a narrowing of the surface of the mercury and consequently to an increase in depression. But if the walls are given a transversal slope, the increase in the depression leads to a further narrowing R of the mercury level at the depth assumed by the depressed mercury and this in its turn leads to a further depression of the liquid.

It is apparent that through a suitable sizing of the apparatus disclosed, it is possible to obtain finally a vertical depression that amplifies considerably the transversal modifications in the cross-section of the thread. A limit may even be contemplated for which this vertical displacement is infinitely greater, speaking mathematically, than the variation in diameter of the thread that has produced it.

Figure 15:
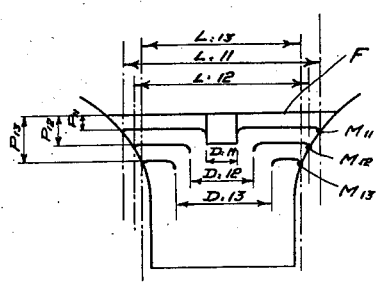
Fig. 15 is an explanatory graph showing the manner in which is determined the profile of the channel in a modified embodiment of the invention.
Figure 16:
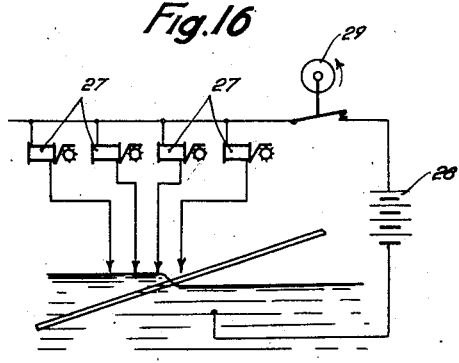
Fig. 16 is a representation of a modification of the device of Fig. 10.

This arrangement, that is already of considerable interest, shows the drawback of not providing a proportional response to the variations in diameter of the thread. This latter drawback may be removed in its turn and comparatively intricate mathematical considerations have finally led us to the definition of a wall profile of hyperbolic shape (Fig. 15) such that the variations in the liquid level may be at every moment proportional to the variations in diameter of the thread, said variations in depth being also considerably amplified. The outline of the wall is obtained by calculating for three diameters D11, D12, D13 of the thread the corresponding sizes L11, L12, L13 of the channel which gives variation in depth P11, P12, P13 proportional to the variation in diameter e. g. equal to a half of said variation in diameter; the three points M11, M12, M13 defined under the free level F of the mercury by the so calculated depth and width of the channel are joined by a hyperbolic line defining the outline of the channel.

A first important result is thus obtained that consists in translating the variations in diameter of the thread into a simple physical phenomenon which it is now necessary to apply to practical work.

In order to understand the modus operandi of the apparatus, we will first consider no longer the breadth of the liquid channel but its length.

Figure 6:
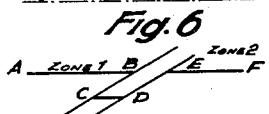
Figure 7:
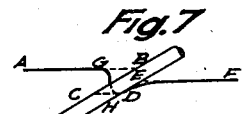

Fig. 6 shows the three zones defined by the thread in the liquid channel. If each of said zones were to exist alone, the corresponding liquid surfaces would be bounded by three planes A—B, C—D and E—F that are independent of one another. By reason of the reduced size of the apparatus on one hand and of the existence of the surface pressure phenomena on the other, it is obvious that at their meeting points the surfaces of the first and second zones for instance will be connected to one another through a curvilinear outline A G H E F (Fig. 7) lying between the theoretical above mentioned plane surfaces AB and CD.

For a suitable size given to the apparatus, experience shows that this mean equilibrium outline shows a part with a considerable radius of curvature forming a liquid vertical cliff located approximately at mid-distance between the theoretical cooperating ends B and C of the zones 1 and 2. The very existence of this liquid cliff confers surprising advantages to our apparatus.

Figure 8:

Considering as a matter of fact the thread on the channel (Fig. 8) said thread passes over two guiding members P and Q over which it bears through its lower generating line. For a certain value of the diameter of this thread, the mercury levels in the zones 1 and 2 correspond to a first position of the liquid cliff. Supposing now the cross-section of the thread increases, in order to distinguish clearly the phenomena, the increase in size of the thread may be considered as obtained in two stages; to wit: an increase of its horizontal bulk i. e. of its width; an increase of its vertical bulk i. e. of its height. At the moment at which an increase is given to the horizontal bulk of the thread, the surface of the liquid remaining free between the thread and the wall is reduced and the depression in the zone of the channel increases, while the end of the medial zone recedes by a certain amount $xy$; the liquid cliff forming the thread sensitive part recedes thereby first from M to N. Now if the thread is submitted to a similar increase in its vertical direction, the upper generating line of the thread recedes through a certain amount and the same end of the medial zone of the channel recedes again from $y$ to $z$. Consequently, the liquid cliff recedes again from N to O, which still further increases the previous receding movements.

It is essential to note that such longitudinal displacements of the liquid cliff depend to a considerable extent on the slope $a$ of the thread that produces them and more specifically they are a function of $$\frac{1}{\sin a}$$

It is apparent that this provides means for considerable amplification together with means for adjusting sensitivity while providing a particularly high adaptability and ease of operation. In practice, the threads used are generally of circular cross-section, but the phenomena corresponding thereto are in practice very little different from those that have just been disclosed.

Finally, through the accumulation of the phenomena that have just been described, all the instantaneous modifications in the diameter of cross-sections of the thread correspond to a forward or rearward movement of the liquid cliff that by reason of its very nature assumes a truly extraordinary mobility. By acting both on the transversal size of the channel, on the outline of its walls and on the slope of the thread, it is possible finally to obtain a phenomenon that considerably amplifies all the variations in diameter appearing in succession during the unwinding of the thread, the coefficient of amplification of the apparatus being adjustable as desired, for instance through a mere modification of the inclination of the thread.

In order to ensure constancy of the indications given by the instrument, it is necessary to provide for the permanency of the surface pressure of the mercury. As the latter is more or less rapidly soiled both by the dirt and impurities introduced by the thread as it unwinds and by the products of the oxidation of the mercury, in particular in the case of textiles, suitable auxiliary devices such as settling tank 18 from which the mercury is drawn into a circulating pump 17 which delivers it to the device through a filter 19 are provided for the continuous replacement of the soiled mercury by suitably purified mercury.

As the operation of our improved method relies chiefly on capillary phenomena, it should be expressly mentioned that the following arrangements are provided, that form an integral part of our apparatus: means for providing constancy of the surface pressure; means providing a depression proportional to the size of the thread.

The substantial difference in specific weight between mercury and certain textile threads leads during the passage of the thread through the mercury to a substantial Archimedes effect. In order to compensate this effect, the thread should be suitably subjected to tension.

The very high sensitivity of the apparatus requires constancy for the mechanical tension of the thread during its movement. To this purpose, the thread under examination and driven by the guides 13, 14 and the winch 15 is tensioned by passing on a roller 20 which drives through gears a disc of copper or the like material 21 which is so caused to rotate under the action of the unwinding of the thread. Said disc that rotates between the poles of one or more magnets or electromagnets 22 is submitted to a perfectly regular braking that gives the driving thread a perfectly constant tension without any vibrations. Simple devices including for instance a displacement of the magnets or electromagnets or the adjustment of the intensity of the electromagnet current allow adjusting to any desired value the mechanical tension to which the thread is submitted as it passes over the braking disc.

Various adjusting means allow adjusting the sensitivity of the apparatus to any desired value. Among these adjusting means and by way of example, we may mention for instance a modification of the width of the channel by modification of the position of its walls 10, a modification of the level of the mercury in the channel through a raising of the overflow sills 24 and 23 or through a modification in the flow of mercury, a modification in the slope of the thread by means of a suitable thread guiding arrangement 25, adjustment of the position of the thread inside the channel, etc.

We will now describe by way of example and a number of gauging and measuring apparatuses applying the principles disclosed hereinabove and which may be termed thread regularity gauging and recording apparatuses.

Figure 9:
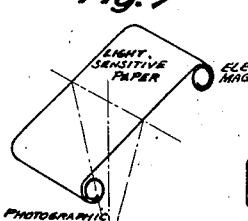

Fig. 9 shows a photographic thread regularity recording apparatus embodying the principles of our invention.

When illuminating the surface of the mercury in its channel through a beam of light obtained through a suitable optical means, the following phenomena will be observed:

At the point at which the thread passes through the mercury level, said level assumes a particular shape bestowing onto it the remarkable properties of an incurved mirror the reflection caustic of which is practically reduced to a point. This punctual image that is extremely brilliant accompanies with perfect accuracy the least displacements of the mercury cliff.

It is sufficient to provide above the channel a photographic object glass and a camera obscura inside which a light sensitive paper is unwound in order to record the changes in direction of the beam reflected by the cliff and to produce with the greatest ease diagrams recording the regularity of the thread with a truly astonishing accuracy. It should be mentioned that with a suitable adjustment of the size of the optic recording means, it is also possible to considerably multiply the total amplification coefficient of the apparatus thus established through optic amplification. Suitable auxiliary means allow the inscription on the record of periodic signals that mark out the unwinding of the thread or else the inscription through a predetermined sign of any particularity of the thread as it unwinds.

Figure 10:
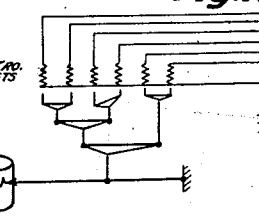

Fig. 10 illustrates an electro-mechanical modification of the above recording means. To this purpose, it should be pointed out that heretofore the level of the mercury was considered as being the same in the two outer zones of the liquid channel. In practice a continuous change of mercury provides for retaining a constant value of its capillary properties and this leads to a loss of head between the level of the input into the channel and the output level of the mercury passing out of the channel. Under such conditions the levels in the first zone and in the third zone are slightly shifted with reference to one another and this difference in level may be made use of in the devices illustrated diagrammatically in Fig. 10. A number of electric contact-pieces are adapted to be flush with the mercury in the zone 1 while remaining spaced with reference to zones 2 and 3 of the channel. Each contact-piece is connected with an electromagnet that is energized when electric current is fed thereto through the displacements of the liquid cliff beyond its contact piece.

The number of electromagnets energized at any moment depends on the position of the liquid cliff and thereby on the diameter of the thread at the moment considered. A suitable linkage or the like equivalent means provides for the totalisation of the displacements of the armatures in the different electromagnets and the resultant movement is recorded by means of a lever on a suitable arrangement such as a rotary recording cylinder as illustrated.

Figure 11:
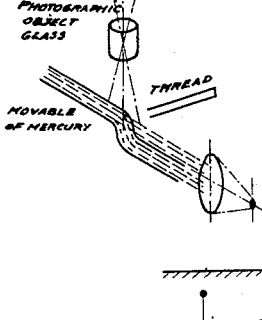
Figure 11:
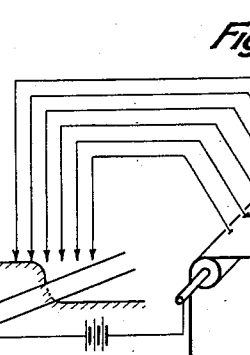

Fig. 11 illustrates a meter for the transversal regularity of the threads.

A number of electric contacts are flush with the free surface of the mercury in the channel under conditions such that only those are electrically in contact therewith that are on the upstream side of the liquid cliff. Each contact-piece is connected with a counter of electric pulses 27 (Fig. 17) constituted for instance by a counter of telephone calls. A source of current 28 is connected on the one hand to the mercury and on the other to the common output of the winding of all the counters. Under such conditions, each time the thread becomes thicker or thinner, the liquid cliff moving inside the channel sends current into a varable number of counters. The more the thread varies in size and the more the liquid cliff moves, the greater is the number of contact-pieces switched in or out of the circuit. For each defect of the thread the whole series of electromagnets energized thereby will receive a current pulse and the corresponding counters will automatically record one energization.

As for a given adjustment of the apparatus, each contact-piece corresponds to a predetermined diameter of the thread, it is apparent that from reading the records of the counters, a statistical account may be obtained automatically of the diameters or cross-sections of the threads, the thickness being measured in discrete steps and recording made by pulses.

A rough sketch (Fig. 12) allows understanding readily the procedlure in such an operation. The left-hand part of the figure shows the variation in diameter of a thread as the ordinates of a graph, the abscissae of which represent distances along the thread. Each horizontal line corresponds to a diameter for which a pulser is energised. The right-hand part of the figure is a sketch of the pulses registered by the counters. Obviously for a thread with a small number of defects which are all of small amplitude, the number of meters energized and the number of pulses recorded is small. On the contrary, for a thread with large defects in rapid succession the number of meters energized varies considerably and the number of pulses recorded is much greater. As each contact-piece corresponds to a perfectly well defined thread diameter, it will be immediately understood that by translating the numbers recorded by the meters into a statistical curve, it is possible to obtain in the more general meaning of the word, complete statistics of the irregularities shown by the sample of thread under examination.

Figure 12:
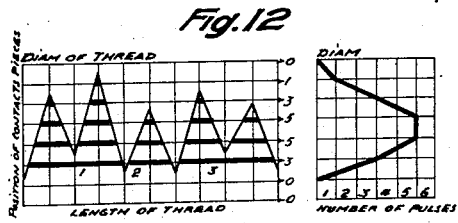
Fig. 12 is a graph corresponding to the operation of Fig. 11.
Figure 13:
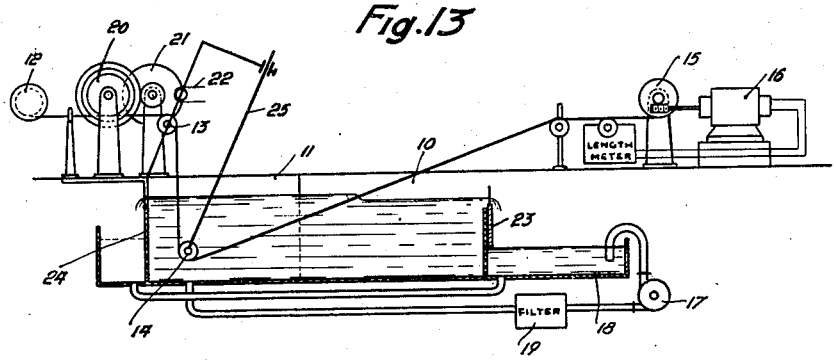
Fig. 13 is a lateral sectional view of an embodiment of the mechanical parts of the device.

The right hand of Fig. 12 is a curve obtained in carrying in ordinate the diameter of thread and in abscissa the numbers of pulses obtained with a device giving a pulse each time the diameter of the gauged thread passes from a diameter smaller than the diameter in ordinate to a diameter larger than said diameter.

It is important to note that the numbers recorded by the transversal regularity meter, that is a meter which measures and registers the variation of diameter independently of the length of the thread having diameter, are applicable to all mathematic methods used for statistical analysis and allow for instance finding the mean value of the diameter, the absolute variation, the relative variation, the typical variation, the quadratic variation, the probable variation, etc.

We may also provide a longitudinal regularity meter according to the invention i. e. a meter which registers the length of the thread, the diameter of which is above a given value. This last meter removes the drawback that may be found in the preceding meter operating transversally and consisting in that defects of equal amplitude but of different length are recorded statistically through the same numbers. Now the length of such defects has a course an importance that is comparable to that of their amplitude. Our invention removes this defect in an easy manner by inserting in the circuit feeding the meters a periodically acting current breaker 29 cutting off the feed of the meters, say at every centimeter of thread. This arrangement provides immediately statistics differing from the preceding statistics and taking into account the length of each sort of defect as is shown in left hand of Fig. 12.

The statistics given out by transversal regularity gauges of the meter appear under the form of so-called frequency curves.

The statistics of longitudinal regularity gauges of the meter appear under the form of so-called accumulative curves.

Obviously conventional statistic methods are applicable indifferently to both forms of execution.

Furthermore it should be remarked that the above described regularity gauges or meters may be associated or not inside a common apparatus.

For instance, the transversal and longitudinal regularity gauges may have their meters associated with an electro-chemical recording device such as that shown in Figure 11 in which the electric current passing through the contacts is used to make an impression on a sensitive recording sheet the said sheet being carried away at a speed proportional to that of the thread. The length of an impression corresponding to a given diameter is proportional to the length of the portion of the thread having the said diameter. Lastly, it is obvious that the shapes, arrangements, details, sizes, adjustments and ranges of sensitivity of the invention and the like may vary without any modification in its principle as defined in appended claims. In particular, the electromotive force and the current supply to be used, the number of contact-pieces to be used with the sensitive channel, the number of pulsemeters, and the wiring diagram may be modified without altering the principle of the invention as defined in said appended claims.

What we claim is:

1. An arrangement for gauging the cross-section of a thread comprising a narrow channel, a mass of mercury filling same, means for continuously renewing the mass of mercury, means for directing the thread in a vertical plane spaced from the walls of said channel and causing the thread to pass at an angle oblique to the horizontal up through the surface of the mercury within said channel, means for driving said thread in a continuous manner along the direction defined hereinabove and means for detecting the variations in the location of the cliff of the mercury upstream of the point of passage of the thread through the mercury level.

2. An arrangement for gauging the cross-section of a thread comprising a narrow channel with slightly upwardly flaring walls, a mass of non-wetting liquid filling same, means for directing the thread and causing the thread to pass at an angle oblique to the horizontal up through surface of the liquid within said channel, means for driving said thread in a continuous manner along the direction defined hereinabove and means for detecting the variations in the location of the cliff of the mercury upstream of the point of passage of the thread through the liquid level.

3. An arrangement for gauging the cross-section of a thread comprising a narrow channel with slightly upwardly flaring walls, a mass of mercury filling same, means for directing the thread in a vertical plane spaced from the walls of said channel and causing the thread to pass at an angle oblique to the horizontal up through the surface of the mercury within said channel, means for driving said thread in a continuous manner along the direction defined hereinabove, a source of light adapted to project a beam of light on the mercury cliff produced by the passage of the thread through the mercury and means for recording the changes in direction of the beam reflected by said cliff.

4. An arrangement for gauging the cross section of a thread comprising a narrow channel, a mass of mercury filling same, means for continuously renewing the mass of mercury, means for directing the thread in a vertical plane spaced from the walls of said channel and causing the thread to pass at an angle oblique to the horizontal up through the surface of the mercury within said channel, means for driving said thread in a continuous manner along the direction defined hereinabove and means for detecting electrically the location of the cliff of mercury formed transversally upstream of the passage of the thread through the mercury level and means responsive to said detecting means for indicating through the displacement of said location the thickness of the thread at the point passing at the moment considered through the mercury level.

5. An arrangement for gauging the cross-section of a thread comprising a narrow channel, a mass of mercury filling same, means for continuously renewing the mass of mercury, means for directing the thread in a vertical plane spaced from the walls of said channel and causing the thread to pass at an angle oblique to the horizontal up through the surface of the mercury within said channel, means for driving said thread in a continuous manner along the direction defined hereinabove and means for detecting electrically the location of the cliff of mercury formed transversally upstream of the passage of the thread through the mercury level and means responsive to said detecting means for recording through the displacement of said location the thickness of the thread at the point passing at the moment considered through the mercury level.

6. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, means for detecting the variations in the location of the cliff of mercury formed by the passage of the thread produced by different cross-sections of the thread entering the liquid and electromagnetic counters responsive to said detecting means forming numeric statistics of the variations in level in the different possible ranges of such differences.

7. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, means for detecting the variations in the location of the cliff of mercury formed by the passage of the thread produced by different cross-sections of the thread entering the liquid including a plurality of contact-pieces flush with the upstream surface of the liquid near the point of passage of the thread through the liquid level, electromagnets cooperating with said contact-pieces, circuits feeding said electromagnets through the cooperating contact-pieces and adapted to energize the corresponding electromagnets when the cliff formed by the passage of the thread through the liquid level reaches the corresponding contact pieces and means controlled by said electromagnets for recording the variations in cross-section of the thread corresponding to the energization of the electromagnets.

8. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, means for detecting the variations in the location of the cliff of mercury formed by the passage of the thread produced by different cross-sections of the thread entering the liquid including a plurality of contact-pieces flush with the surface of the liquid upstream of the point of passage of the thread through the liquid level, a plurality of electric pulse counters fed by said contact-pieces and electric circuits passing through said pieces and adapted to send a pulse in the corresponding counters whenever the liquid cliff formed by the passage of the thread through the liquid level has reached the corresponding contact-pieces.

9. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, a plurality of contact pieces flush with the surface of the liquid upstream of the point of passage of the thread through the liquid level, electromagnets cooperating with said contact pieces, circuits feeding said electromagnets through the cooperating contact pieces and adapted to be closed when the liquid cliff formed by the passage of the thread through the liquid level has reached said contact pieces, means for switching off the current in said circuits at short regular intervals, means controlled by said electromagnets for recording the variations in cross section of the thread substantially in proportion to their length as given out by the current pulses.

10. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, a plurality of contact pieces flush with the surface of the liquid upstream of the point of passage of the thread through the liquid level, a plurality of meters fed by said contact pieces and electric circuits passing through said pieces and adapted to send a pulse in the corresponding meters whenever the liquid cliff formed by the passage of the thread through the liquid level has reached the corresponding contact pieces and means for switching off the current in said circuits at short regular intervals.

11. An arrangement for recording the diameters of a thread throughout its length comprising a narrow channel, a mass of non-wetting liquid filling same, means for directing the thread in a vertical plane spaced from the walls of said channel and causing the thread to pass at an angle oblique to the horizontal up through the surface of the liquid within said channel, means for detecting the variations in the liquid level produced by different cross sections of the thread entering the liquid including a plurality of contact pieces flush with the surface of the liquid upstream of the point of passage of the thread through the liquid level, a plurality of meters fed by said contact pieces and electric circuits passing through said pieces and adapted to send a pulse in the corresponding meters whenever the liquid cliff formed by the passage of the thread through the liquid level has reached said pieces and said meters including means for electrochemically recording said pulses.

12. An arrangement for gauging the cross-section of a thread, comprising a narrow channel, a mass of non-wetting liquid in said channel, means for drawing said thread lengthwise in a continuous manner obliquely through the surface of said liquid and in a plane spaced from the walls of said channel, and means for indicating the variations in the location of the cliff of liquid formed upstream of the point of passage of the thread through the liquid surface, thereby indicating variations in the cross-section of the thread.

13. An arrangement for recording the diameters of a thread throughout its length, comprising a narrow channel, a mass of non-wetting liquid in said channel, means for drawing the thread lengthwise through the surface of the liquid along an oblique line in the plane of symmetry of the channel, means for detecting the variations in the location of the cliff of liquid formed by the passage of the thread produced by the different cross-sections of the thread passing therethrough, and means responsive to said detecting means for recording the detected variations.

LOUIS FRANÇOIS GUIMBRETIERE.
EUGÈNE JEAN SOREZ.

REFERENCES CITED

The following references are of record in the file of this patent:

UNITED STATES PATENTS

| Number | Name | Date |
|---|---|---|
| 1,955,315 | Styer | Apr. 17, 1934 |
| 2,057,032 | Keen | Oct. 13, 1936 |
| 2,236,583 | Selvig | Apr. 1, 1941 |
| 2,490,627 | Hofberg | Dec. 6, 1949 |

OTHER REFERENCES

Page 284 of Die Kunstseide, a magazine, July 1931, a part of an article entitled "Titerrogelmassigkeit von Gespinsten ihre Bestimmung and Bedeutung" by Dr. E. Viviani.